United States Patent [19]

Abiko et al.

[11] Patent Number: 5,605,990
[45] Date of Patent: Feb. 25, 1997

[54] PROCESS FOR PRODUCING POLYOLEFIN

[75] Inventors: Toshiya Abiko; Kenji Nakacho, both of Ichihara, Japan

[73] Assignee: Idemitsu Petrochemical Co., Ltd., Tokyo, Japan

[21] Appl. No.: 208,952

[22] Filed: Mar. 11, 1994

[30] Foreign Application Priority Data

Mar. 12, 1993 [JP] Japan .................................. 5-052438

[51] Int. Cl.$^6$ ........................................................ C08F 4/64
[52] U.S. Cl. ......................... 526/128; 526/153; 526/160; 526/943; 502/152
[58] Field of Search ..................... 526/128, 153, 526/160, 943

[56] References Cited

U.S. PATENT DOCUMENTS

| | | | |
|---|---|---|---|
| 4,677,088 | 6/1987 | Huff et al. | 502/121 |
| 4,914,168 | 4/1990 | Coosemans et al. | 526/127 |
| 4,946,816 | 8/1990 | Cohen et al. | 502/126 |
| 4,990,479 | 2/1991 | Ishimaru et al. | 502/125 |
| 5,223,465 | 6/1993 | Ueki et al. | 502/117 |

FOREIGN PATENT DOCUMENTS

| | | |
|---|---|---|
| 0241560 | 10/1987 | European Pat. Off. |
| 0314797 | 5/1989 | European Pat. Off. |
| 0418937 | 3/1991 | European Pat. Off. |
| 1947588 | 4/1970 | Germany . |
| 92/09640 | 6/1992 | WIPO . |

OTHER PUBLICATIONS

Database WPI, Derwent Publications Ltd., AN 93-392686, JP-A-5295021, Nov. 9, 1993.

*Primary Examiner*—David W. Wu
*Attorney, Agent, or Firm*—Oblon, Spivak, McClelland, Maier & Neustadt, P.C.

[57] ABSTRACT

A process for producing a polyolefin is here disclosed which comprises the step of polymerizing olefins in the presence of a catalyst comprising (A) a compound of a transition metal in the group IV of the Periodic Table, (B) an aluminoxane, (C) a compound having 2 or more aromatic rings in its molecule represented by the formula $$Ar^1—(YR_{n-2})_k—Ar^2$$

wherein the symbols are as defined in the specification, and if necessary, (D) an organic aluminum compound. In this process, the novel catalyst having a high polymerization activity is used, whereby the desired polyolefin can be efficiently produced.

18 Claims, No Drawings

PROCESS FOR PRODUCING POLYOLEFIN

BACKGROUND OF THE INVENTION

1. Field of the Invention

The present invention relates to a process for producing a polyolefin. More particularly, it pertains to a process for efficiently producing a polyolefin, particularly a linear low-density polyethylene in the presence of a catalyst having a high polymerization activity in a reduced amount of an aromatic hydrocarbon solvent which is harmful to health without using an expensive metallocene compound as the polymerization catalyst.

2. Description of Related Art

In recent years, in a process for producing a polyolefin, a catalyst comprising a metallocene compound of a transition metal and an aluminoxane has been suggested as a novel uniform catalyst (Japanese Patent Application Laid-open No. 19309/1983). This uniform catalyst has a very high activity and an excellent copolymerizability, but the metallocene compound and the aluminoxane are more expensive as compared with a conventional Ziegler-Natta catalyst. Thus, the suggested catalyst has a problem that its cost is high.

In order to overcome the above-mentioned drawback, there has been suggested a method in which a uniform catalyst comprising an oxygen-containing titanium compound and an aluminoxane is used without employing any metallocene compound (Japanese Patent Application Laid-open No. 3008/1988). However, this method also has a problem that a catalytic activity is so low that a polyolefin cannot be efficiently produced.

Furthermore, in the above-mentioned catalyst system using the aluminoxane, a large amount of an aromatic hydrocarbon such as toluene is used as a polymerization solvent or a catalyst control solvent, but the aromatic hydrocarbon has a problem of carcinogenicity or the like. For this reason, it is desired to use another safe polymerization solvent or catalyst control solvent.

The group of the present inventors has already suggested, as a technique for solving the above-mentioned problem, a process using a catalyst which mainly comprises a specific transition metal compound, an aluminoxane, an organic aluminum compound and/or a compound having a π electron (Japanese Patent Application No. 234077/1992).

SUMMARY OF THE INVENTION

Under such circumstances, an object of the present invention is to provide a process for efficiently producing a polyolefin in the presence of a catalyst having a high polymerization activity in a reduced amount of an aromatic hydrocarbon solvent without using any expensive metallocene compound.

The present inventors have intensively conducted research with the intention of achieving the above-mentioned object, and as a result, they have found that when a specific compound having 2 or more aromatic rings in its molecule and if desired, an organic aluminum compound are together present in a catalyst comprising a specific transition metal compound and an aluminoxane, a high polymerization activity can be obtained, whereby the above-mentioned object can be attained. The present invention has now been completed on the basis of this knowledge.

That is, the present invention is directed to a process for producing a polyolefin which comprises the step of polymerizing olefins in the presence of a catalyst comprising (A) a compound of a transition metal in the group IV of the Periodic Table, (B) an aluminoxane, and (C) a compound having 2 or more aromatic rings in its molecule represented by the formula $$Ar^1-(YR_{n-2})_k-Ar^2$$

wherein $Ar^1$ and $Ar^2$ are each an aryl group, and they may be the same or different; Y is an atom in the group II, XIII, XIV, XV or XVI of the Periodic Table; R is a hydrogen atom, halogen atom, alkyl group having 1 to 20 carbon atoms, alkoxy group having 1 to 20 carbon atoms, aryl group having 6 to 20 carbon atoms, aryloxy group having 6 to 20 carbon atoms, silano group or alkylsilano group having 1 to 20 carbon atoms; n is a valence of Y; k is an integer of 0 to 10; when k is 2 or more, Y may be the same or different; when the plural Rs are present, they may be the same or different; and when the two Rs are the alkyl groups, they may bond to each other in a cyclic form.

In addition, the present invention is directed to a process for producing a polyolefin which comprises the step of polymerizing olefins in the presence of a catalyst comprising the component (A), the component (B), the component (C) and an organic aluminum compound (D).

DETAILED DESCRIPTION OF THE INVENTION

In a catalyst which can be used in the present invention, as the component (A), there can be used a compound of a transition metal in the group IV of the Periodic Table. In the concrete, a transition metal compound is used which is represented by the formula $$MR^1_a R^2_b R^3_c R^4_d \qquad (I)$$

wherein M is a transition metal in the group IV of the Periodic Table; $R^1$, $R^2$, $R^3$ and $R^4$ are each a σ-bonding ligand, chelating ligand or Lewis base, and they may be the same or different; and a, b, c and d are each 0 or an integer of 1 to 4.

In the above-mentioned formula (I), M is a transition metal in the group IV of the Periodic Table, and examples of M include titanium, zirconium and hafnium.

Furthermore, $R^1$, $R^2$, $R^3$ and $R^4$ independently of one another, are each a σ-bonding ligand, chelating ligand or Lewis base.

Here, typical examples of the σ-bonding ligand include a hydrogen atom, oxygen atom, halogen atom, alkyl group having 1 to 20 carbon atoms, alkoxy group having 1 to 20 carbon atoms, aryl group, alkylaryl group and arylalkyl group each having 6 to 20 carbon atoms, acyloxy group having 1 to 20 carbon atoms, allyl group, substituted allyl group and substituent containing a silicon atom. Examples of the chelating ligand include an acetylacetonato group and substituted acetylacetonato group. $R^1$, $R^2$, $R^3$ and $R^4$ may form a ring by a mutual bond of two or more thereof. Moreover, a, b, c and d, independently of one another, are each 0 or an integer of 1 to 4.

Examples of the compound represented by the formula (I) include tetramethyltitanium, tetrabenzyltitanium, tetramethoxytitanium, tetraethoxytitanium, tetrapropoxytitanium, tetrabutoxytitanium, tetrachlorotitanium, tetrabromotitanium, butoxytrichlorotitanium, butoxydichlorotitanium, bis(2,6-di-t-butylphenoxy)dimethyltitanium, bis(2,6-di-t-butylphenoxy)dichlorotitanium, titanium bis(acetylacetonato), bis(acetylacetonato)dichlorotitanium and bis(acetylacetonato)dipropoxytitanium. Additional examples of the compound having the formula (I) include these compounds in which titanium is replaced with each of zirconium and hafnium.

These transition metal compounds may be used singly or in combination of two or more thereof.

In the catalyst which can be used in the present invention, a transition metal compound containing a group having conjugated π electrons as a ligand can also be used as the component (A). Examples of this kind of transition metal compound include compounds represented by the formulae (II), (III) and (IV)

and their derivatives.

In the above-mentioned formulae (II) to (IV), M is a transition metal such as titanium, zirconium or hafnium in the group IV of the Periodic Table, and Cp is a cyclic unsaturated hydrocarbon group or chain unsaturated hydrocarbon group such as a cyclopentadienyl group, substituted cyclopentadienyl group, indenyl group, substituted indenyl group, tetrahydroindenyl group, substituted tetrahydroindenyl group, fluorenyl group or substituted fluorenyl group. $R^1$, $R^2$ and $R^3$ are each the same as in the case of the formula (I). $A_d$ is a crosslinkage by a covalent bond. Moreover, a, b and c, independently of one another, are each an integer of 0 to 4, and d is an integer of 0 to 6. $R^1$, $R^2$ and $R^3$ may form a ring by a mutual bond of two or more thereof. In the case that Cp has a substituent, this substituent is preferably an alkyl group having 1 to 20 carbon atoms. In the formulae (III) and (IV), two Cps may be the same or different.

In the catalyst which can be used in the present invention, an aluminoxane is used as the component (B). As this aluminoxane which is the component (B), a conventional known compound can be used. The preferable aluminoxane is a cyclic aluminoxane represented by the formula (V)

wherein $R^5$ is a hydrocarbon group having 1 to 8 carbon atoms; and r is an integer of 2 to 100, or a straight-chain aluminoxane represented by the formula (VI)

wherein $R^6$, $R^7$, $R^8$ and $R^9$, independently of one another, are each a hydrocarbon group having 1 to 8 carbon atoms; and s is an integer of 2 to 100.

Preferable examples of $R^6$, $R^7$, $R^8$ and $R^9$ include alkyl groups such as a methyl group, ethyl group and isobutyl group, and r and s are preferably each in the range of 7 to 40.

This aluminoxane which is the component (B) may be used singly or in combination of two or more thereof.

Furthermore, in the catalyst which can be used in the present invention, as the component (C), there is used a compound having 2 or more aromatic rings in its molecule represented by the formula (VII)

wherein $Ar^1$, $Ar^2$, Y, R, k and n are as defined above.

Typical examples of the aryl groups represented by $Ar^1$ and $Ar^2$ in the formula (VII) include a phenyl group, tolyl group, xylyl group, octylphenyl group, fluorophenyl group, nitrophenyl group, biphenyl group and naphthyl group.

In a bonding portion represented by $-(YR_{n-2})_k-$ which connects the two aryl groups represented by $Ar^1$ and $Ar^2$ in the formula (VII), Y is an atom in the group II, XIII, XIV, XV or XVI of the Periodic Table, and examples of Y include carbon, silicon, germanium, aluminum, boron, nitrogen, phosphorus, oxygen and sulfur.

Typical examples of $-(YR_{n-2})_k-$ include a methylene group, 1,1-ethylene group, 1,2-ethylene group, dimethylethylene group, 1,1-cyclohexylene group, phenylmethylene group and diphenylmethylene group in which Y is a carbon atom; silylene group, methylsilylene group, dimethylsilylene group, diethylsilylene group and tetramethyldisilylene group in which Y is a silicon atom; dimethylgermilene group in which Y is a germanium atom; phenylaluminum group in which Y is an aluminum atom; phenylboron group in which Y is a boron atom; phenylamino group in which Y is a nitrogen atom; phenylphosphine group in which Y is a phosphorus atom; other groups in which Y is an oxygen atom or sulfur atom; and groups represented by the formulae

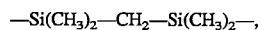

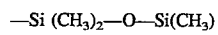

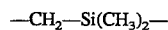

and

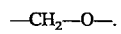

Examples of R in the formula (VII) include a hydrogen atom, halogen atoms (chlorine, fluorine, bromine and iodine), alkyl groups having 1 to 20 carbon atoms (typically, a methyl group, ethyl group, propyl group, n-butyl group, isobutyl group, amyl group, isoamyl group, octyl group and 2-ethylhexyl group), alkoxy groups having 1 to 20 carbon atoms (typically, a methoxy group, ethoxy group, propoxy group, butoxy group, hexyloxy group, octyloxy group and 2-ethylhexyloxy group), aryl groups having 6 to 20 carbon atoms (typically, a phenyl group, tolyl group, xylyl group and naphthyl group), aryloxy groups having 6 to 20 carbon atoms (typically, a phenoxy group, p-tolyloxy group and p-t-butylphenoxy group), silano group and alkylsilano group having 1 to 20 carbon atoms (typically, a trimethylsilano group and triethylsilano group).

Thus, examples of the compound represented by the formula (VII) include diphenyldimethylsilane, diphenyldiethylsilane, triphenylmethylsilane, 1,2-diphenyltetramethyldisilane, dimethyl-di-p-toluylsilane, diphenylmethane, triphenylmethane, dibenzyl, biphenyl, 4-benzylbiphenyl, di(o-toluyl)methane, 2,2-diphenylpropane, triphenylaluminum, triphenylborane, tri(pentafluorophenyl)borane, N-methyldiphenylamine, triphenylphosphine, diphenyl ether and diphenyl sulfide.

They may be used singly or in combination of two or more thereof.

In a certain case, an organic aluminum compound may be additionally used as the component (D) together with the above-mentioned components in the catalyst which can be used in the present invention.

This organic aluminum compound is a compound represented by the formula (VIII)

$$R^{10}_{m}AlX^{1}_{3-m} \quad (VIII)$$

wherein $R^{10}$ is an alkyl group having 1 to 20 carbon atoms or aryl group having 6 to 20 carbon atoms; $X^1$ is a halogen atom, alkoxy group having 1 to 20 carbon atoms or aryloxy group having 6 to 20 carbon atoms; and m is a real number of more than 0 and 3 or less.

Examples of the above-mentioned organic aluminum compound include trimethylaluminum, triethylaluminum, triisobutylaluminum, tri-n-butylaluminum, tri-n-hexylaluminum, tri-n-octylaluminum, triisopropylaluminum, diethylaluminum ethoxide, diisobutylaluminum ethoxide, diethylaluminum chloride and ethylaluminum dichloride.

Among these compounds, preferable is a trialkylaluminum represented by the formula

$$AlR^{11}R^{12}R^{13} \quad (IX)$$

wherein $R^{11}$, $R^{12}$ and $R^{13}$ are each an alkyl group having 1 to 20 carbon atoms, and they may be the same or different.

The organic aluminum compounds enumerated above which are the components (D) may be used singly or in combination of two or more thereof.

In the present invention, the above-mentioned components (A), (B), (C) and (D) are used as the components of the polymerization catalyst. In order to polymerize olefins in the presence of these catalytic components, the catalyst comprising the components (A), (B) and (C) or the catalyst comprising the components (A), (B), (C) and (D) is used as the polymerization catalyst.

No particular restriction is put on the amounts of the components (A), (B), (C) and (D), and so they may be suitably selected in compliance with given situations.

In general, the amount of the component (A) is in the range of 0.0001 to 5 mmols/liter, preferably 0.0005 to 1 mmol/liter.

The component (B)-is used in a ratio of 10 to 100,000, preferably 20 to 10,000 in terms of aluminum with respect to the amount of the component (A); and the component (C) is used in a ratio of 0.1 to 10,000, preferably 1 to 5,000 with respect to the amount of the component (A).

Moreover, the component (D) is used in a ratio of 1 to 10,000, preferably 1 to 1,000 with respect to the amount of the component (A).

In the present invention, a contact product obtained by previously bringing the components (A), (B) and (C), or the components (A), (B), (C) and (D) into contact with one another can be used as the polymerization catalyst in addition to the above-mentioned catalysts.

In the case that the respective catalytic components are subjected to a contact treatment, no particular restriction is put on the contact order of the respective catalytic components, and so they can be brought into contact with one another in an optional order. The reaction product obtained by the contact treatment may be used directly or via a washing step with an inert solvent. Alternatively, after the control solvent has been distilled off, the reaction product may be dispersed in another solvent.

The above-mentioned contact treatment of the respective catalytic components can be carried out by bringing these components into contact with one another in an inert solvent in an inert gas atmosphere under the following conditions.

That is, the respective components are suitably brought into contact with one another so that the component (A) may be in the range of 0.01 to 100 mmols/liter, the component (B) may be in the range of 0.1 to 1,000 mmols/liter in terms of aluminum, the component (C) may be in the range of 0.01 to 1,000 mmols/liter, and the component (D) may be in the range of 0.1 to 1,000 mmols/liter.

Preferably, the respective components are contacted so as to meet the following conditions, and the thus obtained contact product is effective.

$$1<[Al_{AO}]/[Ti]<500 \quad (1)$$

If this ratio is less than 1, its effect cannot be recognized, or if it is more than 500, the component (B) is used in vain, so that a large amount of the aluminum component unpreferably remains in the polymer product.

$$1<[\pi]/[Ti]<2,000 \quad (2)$$

If this ratio is less than 1, the effect is insufficient, or if it is more than 2,000, an activity conversely deteriorates unpreferably sometimes.

$$1<[Al_R]/[Ti]<500 \quad (3)$$

If this ratio is less than 1, the effect is insufficient, or if it is more than 500, the component (C) is used in vain, so that a large amount of the aluminum component unpreferably remains in the polymer product.

In these formulae, [Ti] is a molar concentration of the component (A) in the contact step; $[Al_{AO}]$ is a molar concentration of the component (B) in the same step; $[\pi]$ is a molar concentration of the component (C) in the same step; and $[Al_R]$ is a molar concentration of the component (D) in the same step.

Examples of the inert solvent which can be used in contacting the respective components are aliphatic hydrocarbons and alicyclic hydrocarbons having 5 to 18 carbon atoms. Typical examples of the inert solvent include n-pentane, isopentane, hexane, heptane, octane, nonane, decane, tetradecane and cyclohexane. They may be used singly or in combination of two or more thereof. Among these inert solvents, suitable are hexane, heptane and cyclohexane. No particular restriction is put on the temperature and time of the contact reaction.

In the present invention, olefins are polymerized in the presence of the polymerization catalyst comprising the catalyst and the contact product which have been prepared as described above, thereby producing a polyolefin.

No particular restriction is put on the kind of olefins, and for example, optional olefins such as α-olefins and cyclic olefins having 2 to 10 carbon atoms can be used as monomers. Furthermore, these olefins may include dienes such as butadiene, isoprene, chloroprene and ethylidenenorbornene as comonomers. In addition, copolymerization can also be carried out by the use of the olefin and an unsaturated monomer component, other than the olefin, which is copolymerizable with the olefin.

The process of the present invention can be preferably applied to the manufacture of an ethylene polymer. In particular, it is advantageous to apply this process to the manufacture of a linear low-density polyethylene. In this case, the polymerization may be the homopolymerization of the olefin, or the copolymerization of two or more kinds of olefins, or the olefin and the diene.

Examples of the cyclic olefin include cyclobutene, cyclopentene, cyclohexene, cycloheptene and cyclooctene.

In the manufacture of the ethylene polymer in accordance with the present invention, ethylene may be homopolymerized, or ethylene and another α-olefin or a diene compound may be copolymerized. Examples of this α-olefin include straight-chain and branched monootefins having 3 to 18 carbon atoms and α-olefins substituted by an aromatic ring. Typical examples of such an α-olefin include straight-chain monoolefins such as propylene, 1-butene, 1-hexene, 1-octene, 1-nonene, 1-decene, 1-undecene and 1-dodecene; branched monoolefins such as 3-methylbutene-1, 3-methylpentene-1, 4-methylpentene-1, 2-ethylhexene-1 and 2,2,4-trimethylpentene-1; and a monoolefin substituted by an aromatic ring such as styrene.

Here, preferable examples of the above-mentioned diene compound include straight-chain and branched nonconjugated diolefins having 6 to 20 carbon atoms. Typical examples of the diene compound include 1,5-hexadiene, 1,6-heptadiene, 1,7-octadiene, 1,8-nonadiene, 1,9-decadiene, 2,5-dimethyl-1,5-hexadiene and 1,4-dimethyl-4-tert-butyl-2,6-heptadiene, a polyene such as 1,5,9-decatriene, and an end-methylene-based cyclic diene such as 5-vinyl-2-norbornene.

No particular restriction is put on the polymerization method in the present invention, and an optional polymerization method such as a slurry polymerization method, high-temperature solution polymerization method, gas-phase polymerization method or bulk polymerization method can be employed.

Usable examples of a solvent for the polymerization include inert solvents such as aliphatic hydrocarbons and alicyclic hydrocarbons having 5 to 18 carbon atoms, for example, n-pentane, isopentane, hexane, heptane, octane, nonane, decane, tetradecane and cyclohexane.

They may be used singly or in combination of two or more thereof. Above all, hexane, heptane and cyclohexane are preferable.

The amount of the polymerization catalyst to be used is preferably such that its content is in the range of $10^{-8}$ to $10^{-2}$ mol/liter, preferably $10^{-7}$ to $10^{-3}$ mol/liter in terms of a transition metal atom in the group IV of the Periodic Table.

No particular restriction is put on polymerization temperature, but it is usually selected in the range of 0° to 350° C., preferably 20° to 250° C. Similarly, no particular restriction is put on polymerization pressure, but it is usually selected in the range of 0 to 150 kg/cm²G, preferably 0 to 100 kg/cm²G.

Furthermore, the molecular weight and the molecular weight distribution of the obtained polyolefin can be controlled in a usual manner. That is, this control can be easily achieved by adding hydrogen, an alkyl aluminum or an alkyl zinc to a reaction system at the time of the polymerization.

According to the present invention, a polyolefin can be efficiently produced in the presence of a catalyst having a high polymerization activity without using any expensive metallocene compound.

Therefore, the process of the present invention can be preferably applied to the manufacture of an ethylene polymer, particularly a linear low-density polyethylene.

Next, the present invention will be described in detail in reference to examples and comparative examples, but the scope of the present invention should not be limited to these examples at all.

In this connection, methylaluminoxane was prepared as follows.

Preparation of Methylaluminoxane (MAO)

Methylaluminoxane (a toluene solution) made by Toso Akzo Co., Ltd. was brought to a starch syrup state by reducing pressure at room temperature. Next, the pressure was further reduced at 90° C. for 1 hour to obtain solid methylaluminoxane crystals.

The thus obtained methylaluminoxane crystals were dispersed in hexane to prepare a hexane dispersion of methylaluminoxane at a concentration of 2.0 mols/liter (in terms of an aluminum atom).

EXAMPLE 1

After a dried one-liter polymerization reactor equipped with a stirrer had been purged with dry nitrogen, 360 ml of dry n-hexane and 40 ml of 1-octene were placed in the reactor.

Next, 0.1 mmol of diphenyldimethylsilane, 5.0 mmols of MAO and 0.01 mmol of tetra-n-butoxytitanium were added to the polymerization reactor, and the resulting solution was then heated up to 80° C.

In succession, an ethylene gas was introduced into the reactor, and polymerization was carried out at 80° C. for 60 minutes, while the total pressure was maintained at 8 kg/cm²G.

Immediately after completion of the polymerization, the pressure was released, and methanol was then thrown into the polymerization reactor to stop the polymerization. The contents in the polymerization reactor were thrown into a large amount of an ethanol-hydrochloric acid mixing solution to remove catalyst residue. Afterward, the resulting polymer was collected by filtration, and then dried at 80° C. for 4 hours under reduced pressure to obtain 13.8 g of ethylene-1-octene copolymer having an intrinsic viscosity [η] of 16.1 dl/g.

COMPARATIVE EXAMPLE 1

The same procedure as in Example 1 was carried out except that 0.1 mmol of diphenyldimethylsilane in Example 1 was replaced with 0.1 mmol of phenyltrimethylsilane having only one aromatic ring.

EXAMPLE 2

After a dried one-liter polymerization reactor equipped with a stirrer had been purged with dry nitrogen, 360 ml of dry n-hexane and 40 ml of 1-octene were placed in the reactor.

Next, 0.1 mmol of diphenyldimethylsilane, 1.5 mmols of triisobutylaluminum, 3.5 mmols of MAO and 0.01 mmol of tetra-n-butoxytitanium were added to the polymerization reactor, and the solution was immediately heated up to 80° C.

In succession, an ethylene gas was introduced into the reactor, and polymerization was carried out at 80° C. for 60 minutes, while the total pressure was maintained at 8 kg/cm²G.

Immediately after completion of the polymerization, the pressure was released, and methanol was then thrown into the polymerization reactor to stop the polymerization. The contents in the polymerization reactor were thrown into a large amount of an ethanol-hydrochloric acid mixing solution to remove catalyst residue. Afterward, the resulting polymer was collected by filtration, and then dried at 80° C. for 4 hours under reduced pressure to obtain ethylene-1-octene copolymer.

COMPARATIVE EXAMPLE 2

The same procedure as in Example 2 was carried out except that 0.1 mmol of diphenyldimethylsilane in Example 2 was replaced with 0.1 mmol of phenyltrimethylsilane having only one aromatic ring.

Table 1 shows blend compositions, polymerization activities and the like of the respective components in Examples 1 and 2 as well as Comparative Examples 1 and 2.

This polymerization activity can be defined as follows.

Polymerization activity (kg/g-Ti/hr)=polymer yield (kg)/ Ti amount (g) in component (A).polymerization time (hr)

EXAMPLE 4

(1) Contact Treatment of Four Components

In a 200-ml Schlenk flask were placed 136 ml of hexane, 3.0 mmol of diphenyldimethylsilane as a component (C) and 3.0 ml (3.0 mmols) of a hexane solution of triisobutylaluminum as a component (D).

Next, 3.0 ml of a hexane solution (0.1 mol/liter) of tetra-n-butoxytitanium was added as a component (A) with stirring, followed by stirring for 10 minutes.

In succession, 7.5 ml of MAO (2.0 mols/liter) was added as a component (B), and the solution was then stirred for 60

TABLE 1

| | Component (A) | | Component (B) | | Component (C) | | Component (D) | | Polymerization Time (min) | Polymerization Activity (kg/g-Ti/hr) | $[\eta]$ |
|---|---|---|---|---|---|---|---|---|---|---|---|
| | Kind | Amount mmol | Kind | Amount mmol | kind | Amount mmol | kind | Amound mmol | | | |
| Example 1 | TBT | 0.01 | MAO | 5.0 | Ph$_2$SiMe$_2$ | 0.1 | — | — | 60 | 28.9 | 16.1 |
| Comp. Ex. 1 | TBT | 0.01 | MAO | 5.0 | PhSiMe$_3$ | 0.1 | — | — | 60 | 24.4 | 17.0 |
| Example 2 | TBT | 0.01 | MAO | 3.5 | Ph$_2$SiMe$_2$ | 0.1 | TiBA | 1.5 | 60 | 50.6 | 6.0 |
| Comp. Ex. 2 | TBT | 0.01 | MAO | 3.5 | PhSiMe$_3$ | 0.1 | TiBA | 1.5 | 60 | 41.7 | 5.6 |

TBT: Tetra-n-butoxytitanium
MAO: Methylaluminoxane
Ph$_2$SiMe$_2$: Diphenyldimethylsilane
PhSiMe$_3$: Phenyltrimethylsilane
TiBA: Triisobutylaluminum

EXAMPLE 3

(1) Contact Treatment of Three Components

In a 200-ml Schlenk flask were placed 139 ml of hexane and 3.0 mmols of diphenyldimethylsilane as a component (c).

Next, 3.0 ml of a hexane solution (0.1 mol/liter) of tetra-n-butoxytitanium was added as a component (A) with stirring, followed by stirring for 10 minutes.

In succession, 7.5 ml of MAO (2.0 mols/liter) was added as a component (B), and the solution was then stirred for 60 minutes to carry out a contact treatment. The thus obtained contact product was allowed to age at room temperature for 24 hours.

(2) Copolymerization of ethylene and 1-octene

After a dried one-liter polymerization reactor equipped with a stirrer had been purged with dry nitrogen, 360 ml of dry n-hexane and 40 ml of 1-octene were placed in the reactor.

Next, 5 ml (Ti=10 micromols) of the contact product of the three components was added to the polymerization reactor, and the solution was immediately heated up to 80° C.

In succession, an ethylene gas was introduced into the reactor, and polymerization was carried out at 80° C. for 60 minutes, while the total pressure was maintained at 8 kg/cm$^2$G.

Immediately after completion of the polymerization, the pressure was released, and methanol was then thrown into the polymerization reactor to stop the polymerization. The contents in the polymerization reactor were thrown into a large amount of an ethanol-hydrochloric acid mixing solution to remove catalyst residue. Afterward, the resulting polymer was collected by filtration, and then dried at 80° C. for 4 hours under reduced pressure to obtain 28.5 g of ethylene-1-octene copolymer having an intrinsic viscosity [η] of 18.2 dl/g.

minutes to carry out a contact treatment. The thus obtained contact product was allowed to age at room temperature for 24 hours.

(2) Copolymerization of ethylene and 1-octene

After a dried one-liter polymerization reactor equipped with a stirrer had been purged with dry nitrogen, 360 ml of dry n-hexane and 40 ml of 1-octene were placed in the reactor.

Next, 6.0 mmols of triisobutylaluminum and 0.5 ml (Ti=1.0 micromol) of the contact product of the four components were added to the polymerization reactor, and the solution was immediately heated up to 80° C.

In succession, an ethylene gas was introduced into the reactor, and polymerization was carried out at 80° C. for 60 minutes, while the total pressure was maintained at 8 kg/cm$^2$G.

Immediately after completion of the polymerization, the pressure was released, and methanol was then thrown into the polymerization reactor to stop the polymerization. The contents in the polymerization reactor were thrown into a large amount of an ethanol-hydrochloric acid mixing solution to remove catalyst residue. Afterward, the resulting polymer was collected by filtration, and then dried at 80° C. for 4 hours under reduced pressure to obtain ethylene-1-octene copolymer.

EXAMPLE 5

The same procedure as in Example 4 was carried out except that the amount of hexane at the time of the contact reaction of four components in Example 4 was changed to 129 ml and the amount of MAO (2.0 mols/liter) was changed to 15 ml.

EXAMPLES 6 TO 9 AND COMPARATIVE EXAMPLE 3 AND 4

The same procedure as in Example 5 was carried out except that a component (C) in Example 5 was changed to compounds shown in Table 2.

Table 2 shows the compounds which are the components (C) in Examples 3 to 9 as well as Comparative Examples 3 and 4, polymerization activities, and the like.

for 5 minutes, while the partial pressure of ethylene was maintained at 24 kg/cm$^2$G. Afterward, 20 ml of methanol was thrown into the polymerization reactor to immediately stop the polymerization.

The contents in the polymerization reactor were thrown into a large amount of methanol to remove catalyst residue. Afterward, the resulting polymer was collected by filtration, and then dried at 80° C. for 4 hours under reduced pressure to obtain ethylene-1-octene copolymer.

TABLE 2

| | Component (C) | $Al_{AO}/Ti$ | $Al_R/Ti$ | Polymerization Time (min) | Polymerization Activity kg/g-Ti/hr | $[\eta]$ |
|---|---|---|---|---|---|---|
| Example 3 | $Ph_2SiMe_2$ | 50 | 0 | 60 | 60 | 18.2 |
| Example 4 | $Ph_2SiMe_2$ | 50 | 10 | 60 | 721 | 7.7 |
| Example 5 | $Ph_2SiMe_2$ | 100 | 10 | 60 | 922 | 8.5 |
| Example 6 | $Ph_3SiMe$ | 100 | 10 | 60 | 564 | 9.0 |
| Comp. Ex. 3 | $PhSiMe_3$ | 100 | 10 | 60 | 370 | 3.8 |
| Example 7 | $Ph_2Meth$ | 100 | 10 | 60 | 486 | 4.7 |
| Example 8 | $Ph_3Meth$ | 100 | 10 | 60 | 515 | 6.5 |
| Comp. Ex. 4 | Toluene | 100 | 10 | 60 | 182 | 4.2 |
| Example 9 | $4\text{-}BenPh_2$ | 100 | 10 | 60 | 503 | 4.4 |

$Ph_3SiMe$: Triphenylmethylsilane
$Ph_2Meth$: Diphenylmethane
$Ph_3Meth$: Triphenylmethane
$4\text{-}BenPh_2$: 4-benzylbiphenyl

EXAMPLES 10 TO 15

The same procedure as in Example 4 was carried out except that a component (A) in Example 4 was changed to compounds shown in Table 3.

Table 3 shows the compounds which are the components (A) in Examples 10 to 15, polymerization activities, and the like.

TABLE 3

| | Compnent (A) | Polymerization Time (min) | Polymerization Activity kg/g-Ti/hr | $[\eta]$ |
|---|---|---|---|---|
| Example 10 | Tetramethoxy-titanium | 60 | 610 | 8.9 |
| Example 11 | Tetraethoxytitanium | 60 | 728 | 9.2 |
| Example 12 | Tetraisopropoxy-titanium | 40 | 1,350 | 11.6 |
| Example 13 | Tetraisobutoxy-titanium | 45 | 816 | 8.6 |
| Example 14 | Bis(2,4-pentane-dionate) titanium diisopropoxide | 60 | 413 | 13.0 |
| Example 15 | Bis(2,4-pentane-dionate) titanium dichloride | 60 | 310 | 10.0 |

EXAMPLE 16

After a dried one-liter polymerization reactor equipped with a stirrer had been purged with dry nitrogen, 320 ml of dry n-hexane and 180 ml of 1-octene were placed in the reactor, followed by heating the resulting solution up to 150° C.

Next, 10 ml (Ti=20 micromols) of a contact product prepared under the same conditions as in Example 5 and 2 mmols of triisobutylaluminum were introduced into the polymerization reactor simultaneously with the feed of an ethylene gas, and polymerization was carried out at 150° C.

EXAMPLE 17

The same procedure as in Example 16 was carried out except that the amount of n-hexane to be placed in a polymerization reactor was changed to 380 ml and that of 1-octene was changed to 120 ml.

EXAMPLES 18 AND 19, AND COMPARATIVE EXAMPLES 5 AND 6

The same procedure as in Example 17 was carried out except that a component (C) in Example 17 was changed to compounds shown in Table 4.

Table 4 shows the compounds which are the components (C) in Examples 16 to 19 as well as Comparative Examples 5 and 6, polymerization activities, and the like.

TABLE 4

| | Component (C) | Polymerization Activity kg/g-Ti/5 min | $[\eta]$ | Melting Point °C. |
|---|---|---|---|---|
| Example 16 | $Ph_2SiMe_2$ | 48.0 | 2.0 | 108.4 |
| Example 17 | $Ph_2SiMe_2$ | 42.9 | 2.1 | 113.8 |
| Comp. Ex. 5 | $PhSiMe_3$ | 7.3 | 1.4 | 117.7 |
| Example 18 | $Ph_2Meth$ | 19.5 | 2.3 | 108.2 |
| Comp. Ex. 6 | Toluene | 11.4 | 1.7 | 117.0 |
| Example 19 | Dibenzyl | 23.5 | 1.9 | 110.9 |

EXAMPLE 20

After a dried one-liter polymerization reactor equipped with a stirrer had been purged with dry argon, 380 ml of dry n-hexane and 120 ml of 1-octene were placed in the reactor, followed by heating the resulting solution up to 150° C.

Next, 5 ml (Ti=10 micromols) of a contact product prepared under the same conditions as in Example 11 and 2 mmols of triisobutylaluminum were introduced into the polymerization reactor simultaneously with the feed of an ethylene gas, and polymerization was carried out at 150° C.

for 5 minutes, while the partial pressure of ethylene was maintained at 24 kg/cm²G. Afterward, 20 ml of methanol was thrown into the polymerization reactor to immediately stop the polymerization.

The contents in the polymerization reactor were thrown into a large amount of an ethanol-hydrochloric acid mixing solution to remove catalyst residue. Afterward, the resulting polymer was collected by filtration, and then dried at 80° C. for 4 hours under reduced pressure to obtain ethylene-1-octene copolymer.

EXAMPLE 21

The same procedure as in Example 20 was carried out except that polymerization temperature in Example 20 was changed to 170° C.

EXAMPLES 22 AND 23

The same procedure as in Example 20 was carried out except that 2 mmols of triisobutylaluminum to be added at the time of polymerization in Example 20 was replaced with compounds shown in Table 5.

Table 5 shows additives at the polymerization in Examples 20 to 23, polymerization activities, and the like.

[Polymerization of Propylene]

After a dried one-liter polymerization reactor equipped with a stirrer had been purged with dry nitrogen, 400 ml of dry n-hexane was placed in the reactor.

Next, 1.0 mmol of triisobutylaluminum and 2.0 ml (Ti= 4.0 micromols) of the above-mentioned contact product of the four components were added to the polymerization reactor, and the solution was immediately heated up to 70° C.

In succession, a propylene gas was introduced into the reactor, and polymerization was carried out at 70° C. for 30 minutes, while the total pressure was maintained at 8 kg/cm²G.

Immediately after completion of the polymerization, the pressure was released, and methanol was then thrown into the polymerization reactor to stop the polymerization. The contents in the polymerization reactor were thrown into a large amount of methanol to remove catalyst residue. Afterward, the resulting polymer was collected by filtration, and then dried at 80° C. for 4 hours under reduced pressure to obtain polypropylene.

TABLE 5

| | Additive at Polymerization | | Polymerization Temp. °C. | Polymerization Activity kg/g-Ti/5 min | [η] | Melting Point °C. |
|---|---|---|---|---|---|---|
| | Kind | Amount mmol | | | | |
| Example 20 | Triisobutylaluminum | 2.0 | 150 | 74.0 | 4.5 | 112.5 |
| Example 21 | Triisobutylaluminum | 2.0 | 170 | 27.4 | 3.1 | 113.1 |
| Example 22 | Triisobutylaluminum | 1.0 | 150 | 88.0 | 7.6 | 109.9 |
| Example 23 | Triethylaluminum | 2.0 | 150 | 44.1 | 2.7 | 114.3 |

EXAMPLE 24

[Contact Treatment of Four Components]

In a 200-ml Schlenk flask were placed 136 ml of hexane, 3.0 mmols of 4-benzylbiphenyl as a component (C) and 3.0 ml (3.0 mmols) of a hexane solution of triisobutylaluminum as a component (D).

Next, 3.0 ml of a hexane solution (0.1 mol/liter) of tetra-n-butoxytitanium was added as a component (A) with stirring, followed by stirring for 10 minutes.

In succession, 7.5 ml of MAO (2.0 mols/liter) was added as a component (B), and the solution was then stirred for 60 minutes to carry out a contact treatment. The thus obtained contact product was allowed to age at room temperature for 24 hours.

EXAMPLES 25 AND 26, AND COMPARATIVE EXAMPLE 7

The same procedure as in Example 24 was carried out except that a component (C) in Example 24 was changed to compounds shown in Table 6.

Table 6 shows the compounds which are the components (C) in Examples 24 to 26 as well as Comparative Example 7, polymerization activities, and the like.

TABLE 6

| | Component (C) | Polymerization Activity kg/g-Ti/hr | Intrinsic Viscosity [η] | Steric Regularity | | |
|---|---|---|---|---|---|---|
| | | | | [mm] | [mr] | [rr] |
| Example 24 | 4-BenPh2 | 29.9 | 3.0 | 15 | 39 | 46 |
| Example 25 | Biphenyl | 19.9 | 1.8 | 16 | 44 | 39 |
| Example 26 | Ph₂Meth | 14.7 | 1.7 | 14 | 43 | 43 |
| Comp. Ex. 7 | Toluene | 14.2 | 1.8 | 18 | 47 | 35 |

EXAMPLES 27 TO 29, AND COMPARATIVE EXAMPLE 8

The same procedure as in Example 4 was carried out except that a ratio of a component (C) to a component (A) in Example 4 was changed as shown in Table 7.

Table 7 shows the ratios of the component (C) to the component (A) in Examples 27 to 29 as well as Comparative Example 8, polymerization activities, and the like.

TABLE 7

|  | [π] to [Ti] | Polymerization Activity (kg/g-Ti/hr) | [η] |
|---|---|---|---|
| Example 27 | 1.0 | 304 | 11.1 |
| Example 28 | 0.1 | 44 | 5.1 |
| Example 29 | 100 | 440 | 10.2 |
| Comp. Ex. 8 | 0 | 22 | 3.8 |

EXAMPLE 30

The same procedure as in Example 4 was carried out except that methylaluminoxane (a toluene solution) made by Toso Akzo Co., Ltd. was directly used as it was, as MAO. As a result, an excellent product could be obtained which had a polymerization activity of 752 kg/g-Ti/hr and [η] of 7.5.

EXAMPLES 31 AND 32

The same procedure as in Example 4 was carried out except that each of compounds shown in Table 8 was used as a component (A).

TABLE 8

|  | Component A | Polymerization Time (min) | Polymerization Activity (kg/g-Ti/hr) | [η] |
|---|---|---|---|---|
| Example 31 | Tetra-(methylphenoxy)-titanium | 15 | 1042 | 9.1 |
| Example 32 | Tetra-(trimethylsiloxy)-titanium | 20 | 983 | 8.9 |

EXAMPLE 33

(Contact Treatment of Three Components)

In a 200-ml Schlenk flask were placed 136 ml of hexane, 0.3 mmol of di(o-toluyl)dimethylsilane as a component (C) and 3.0 ml (3.0 mmols) of a hexane solution of triisobutylaluminum as a component (D).

Next, 3.0 ml of a hexane solution (0.1 mol/liter) of tetra-n-butoxytitanium was added as a component (A) with stirring, followed by stirring for 10 minutes.

In succession, 7.5 ml of MAO (2.0 mols/liter) was added as a component (B), and the solution was then stirred for 60 minutes to carry out a contact treatment. The thus obtained contact product was allowed to age at room temperature for 24 hours.

Afterward, copolymerization of ethylene and 1-octene was performed in the same manner as in Example 3. The results are shown in Table 9.

EXAMPLES 34 AND 35

The same procedure as in Example 33 was carried out except that each of compounds shown in Table 9 was used as a component (C).

TABLE 9

|  | component C | Polymerization Time (min) | Polymerization Activity (kg/g-Ti/hr) | [η] |
|---|---|---|---|---|
| Example 33 | Di(o-toluyl)-dimethylsilane | 15 | 568 | 6.2 |
| Example 34 | Di(m-toluyl)-dimethylsilane | 15 | 816 | 9.1 |
| Example 35 | Di(p-toluyl)-dimethylsilane | 15 | 660 | 5.7 |

EXAMPLE 36

(Copolymerization of ethylene and 1-octene)

After a dried one-liter polymerization reactor equipped with a stirrer had been purged with dry nitrogen, 360 ml of dry n-hexane and 40 ml of 1-octene were placed in the reactor.

Next, 2.0 mmols of triisobutylaluminum, 1.0 mmol of trimethylaluminum and 0.5 ml (Ti=1.0 micromol) of a contact product of four components used in Example 4 were added to the polymerization reactor, and the solution was immediately heated up to 80° C.

In succession, an ethylene gas was introduced into the reactor, and polymerization was then carried out at 80° C. for 60 minutes, while the total pressure was maintained at 8 kg/cm²G.

Afterward, the same procedure as in Example 4 was done to obtain 28.0 g of a copolymer having [η] of 3.8.

What is claimed is:

1. A process for producing a polyolefin which comprises the step of polymerizing olefins in the presence of a catalyst comprising (A) a compound of titanium, (B) an aluminoxane, and (C) a compound having 2 or more aromatic rings in its molecule represented by the formula

wherein $Ar^1$ and $Ar^2$ are each an aryl group, and they may be the same or different; Y is an atom in the group XIV of the Periodic Table; R is a hydrogen atom, halogen atom, alkyl group having 1 to 20 carbon atoms or aryl group having 6 to 20 carbon atoms, n is a valence of Y; k is an integer of 0 to 10; when k is 2 or more, Y may be the same or different; when the plural Rs are present, they may be the same or different; and when the two Rs are the alkyl groups, they may bond to each other in a cyclic form.

2. A process for producing a polyolefin which comprises the step of polymerizing olefins in the presence of a catalyst comprising (A) a compound of titanium, (B) an aluminoxane, (C) a compound having 2 or more aromatic rings in its molecule represented by the formula

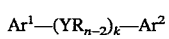

wherein $Ar^1$ and $Ar^2$ are each an aryl group, and they may be the same or different; Y is an atom in the group XIV of the Periodic Table; R is a hydrogen atom, halogen atom, alkyl group having 1 to 20 carbon atoms or aryl group having 6 to 20 carbon atoms, n is a valence of Y; k is an integer of 0 to 10; when k is 2 or more, Y may be the same or different; when the plural Rs are present, they may be the same or different; and when the two Rs are the alkyl groups, they may bond to each other in a cyclic form, and (D) a trialkylaluminum represented by the formula $$AlR^{11}R^{12}R^{13} \tag{IX}$$

wherein $R^{11}$, $R^{12}$ and $R^{13}$ are each an alkyl group having 1 to 20 carbon atoms, and they may be the same or different.

3. The process for producing a polyolefin according to claim 1 wherein said polymerization catalyst is a contact product obtained by previously bringing the components (A), (B) and (C) into contact with one another.

4. The process for producing a polyolefin according to claim 2 wherein said polymerization catalyst is a contact product obtained by previously bringing the components (A), (B), (C) and (D) into contact with one another.

5. The process for producing a polyolefin according to claim 1 wherein said component (A) is a titanium compound represented by the formula $$MR^1{}_aR^2{}_bR^3{}_cR^4{}_d \tag{I}$$

wherein M is titanium; $R^1$, $R^2$, $R^3$ and $R^4$ are each a ρ-bonding ligand, chelating ligand or Lewis base, and they may be the same or different; and a, b, c and d are each 0 or an integer of 1 to 4.

6. The process for producing a polyolefin according to claim 2 wherein said component (A) is a titanium compound represented by the formula $$MR^1{}_aR^2{}_bR^3{}_cR^4{}_d \tag{I}$$

wherein M is titanium; $R^1$, $R^2$, $R^3$ and $R^4$ are each a ρ-bonding ligand, chelating ligand or Lewis base, and they may be the same or different; and a, b, c and d are each 0 or an integer of 1 to 4.

7. The process for producing a polyolefin according to claim 5 wherein said compound represented by the formula (I) is one member selected from the group consisting of tetramethyltitanium, tetrabenzyltitanium, tetramethoxytitanium, tetraethoxytitanium, tetrapropoxytitanium, tetrabutoxytitanium, tetrachlorotitanium, tetrabromotitanium, butoxytrichlorotitanium, butoxydichlorotitanium, bis(2,6-di-t-butylphenoxy) dimethyltitanium, bis(2,6-di-t-butylphenoxy) dichlorotitanium, bis(acetylacetonato)dichlorotitanium and bis(acetylacetonato)dipropoxytitanium.

8. The process for producing a polyolefin according to claim 6 wherein said compound represented by the formula (I) is one member selected from the group consisting of tetramethyltitanium, tetrabenzyltitanium, tetramethoxytitanium, tetraethoxytitanium, tetrapropoxytitanium, tetrabutoxytitanium, tetrachlorotitanium, tetrabromotitanium, butoxytrichlorotitanium, butoxydichlorotitanium, bis(2,6-di-t-butylphenoxy) dimethyltitanium, bis(2,6-di-t-butylphenoxy)dichlorotitanium bis(acetylacetonato)dichlorotitanium and bis(acetylacetonato)dipropoxytitanium.

9. The process for producing a polyolefin according to claim 1 wherein said component (A) is a transition metal compound represented by the following formula (II), (III) or (IV), or its derivative:

$$CpMR^1{}_aR^2{}_bR^3{}_c \tag{II}$$

$$Cp_2MR^1{}_aR^2{}_b \tag{III}$$

$$(Cp\!-\!A_d\!-\!Cp)MR^1{}_aR^2{}_b \tag{IV}$$

wherein M is titanium; Cp is a cyclopentadienyl group, indenyl group, tetrahydroindenyl group, or fluorenyl group; $R^1$, $R^2$ and $R^3$ are each a σ-bonding ligand, chelating ligand or Lewis base, and they may be the same of different; $A_d$ is a crosslinkage by a covalent bond; a, b and c are each an integer of 0 to 4; and d is an integer of 0 to 6.

10. The process for producing a polyolefin according to claim 2 wherein said component (A) is a transition metal compound represented by the following formula (II), (III) or (IV), or its derivative:

$$CpMR^1{}_aR^2{}_bR^3{}_c \tag{II}$$

$$Cp_2MR^1{}_aR^2{}_b \tag{III}$$

$$(Cp\!-\!A_d\!-\!Cp)MR^1{}_aR^2{}_b \tag{IV}$$

wherein M is titanium; Cp is a cyclopentadienyl group, indenyl group, tetrahydroindenyl group, or fluorenyl group; $R^1$, $R^2$ and $R^3$ are each a σ-bonding ligand, chelating ligand or Lewis base, and they may be the same of different; $A_d$ is a crosslinkage by a covalent bond; a, b and c are each an integer of 0 to 4; and d is an integer of 0 to 6.

11. The process for producing a polyolefin according to claim 1 wherein said component (B) is a cyclic aluminoxane represented by the formula (V)

$$-\!\!\left[\begin{array}{c} R^5 \\ | \\ Al\!-\!O \end{array}\right]_{\!r}\!\!- \tag{V}$$

wherein $R^5$ is a hydrocarbon group having 1 to 8 carbon atoms; and r is an integer of 2 to 100, or a straight-chain aluminoxane represented by the formula (VI)

$$R^6\!-\!\!\left[\begin{array}{c} R^7 \\ | \\ Al\!-\!O \end{array}\right]_{\!s}\!\!\begin{array}{c} R^9 \\ | \\ Al\!-\!R^8 \end{array} \tag{VI}$$

wherein $R^6$, $R^7$, $R^8$ and $R^9$, independently of one another, are each a hydrocarbon group having 1 to 8 carbon atoms; and s is an integer of 2 to 100.

12. The process for producing a polyolefin according to claim 2 wherein said component (B) is a cyclic aluminoxane represented by the formula (V)

$$-\!\!\left[\begin{array}{c} R^5 \\ | \\ Al\!-\!O \end{array}\right]_{\!r}\!\!- \tag{V}$$

wherein $R^5$ is a hydrocarbon group having 1 to 8 carbon atoms; and r is an integer of 2 to 100, or a straight-chain aluminoxane represented by the formula (VI)

$$R^6\!-\!\!\left[\begin{array}{c} R^7 \\ | \\ Al\!-\!O \end{array}\right]_{\!s}\!\!\begin{array}{c} R^9 \\ | \\ Al\!-\!R^8 \end{array} \tag{VI}$$

wherein $R^6$, $R^7$, $R^8$ and $R^9$, independently of one another, are each a hydrocarbon group having 1 to 8 carbon atoms; and s is an integer of 2 to 100.

13. The process for producing a polyolefin according to claim 1 wherein said component (C) is one member selected from the group consisting of diphenyldimethylsilane, diphenyldiethylsilane, triphenylmethylsilane, 1,2-diphenyltetramethyldisilane, dimethyl-di-p-toluylsilane, diphenylmethane, triphenylmethane, bibenzy, biphenyl, 4-benzyldiphenyl, di(o-toluyl)methane and 2,2-diphenylpropane.

14. The process for producing a polyolefin according to claim 1 wherein said component (C) is one member selected from the group consisting of diphenyldimethylsilane, diphenyldiethylsilane, triphenylmethylsilane, 1,2-diphenyltetramethyldisilane, dimethyl-di-p-toluylsilane, diphenylmethane, triphenylmethane, bibenzy, biphenyl, 4-benzyldiphenyl, di(o-toluyl)methane and 2,2-diphenylpropane.

15. The process for producing a polyolefin according to claim 2 wherein said component (D) is a compound represented by the formula (VIII)

$$R^{10}{}_m AlX^1{}_{3-m} \tag{VIII}$$

wherein $R^{10}$ is an alkyl group having 1 to 20 carbon atoms or aryl group having 6 to 20 carbon atoms; $X^1$ is a halogen atom, alkoxy group having 1 to 20 carbon atoms or aryloxy group having 6 to 20 carbon atoms; and $0<m\leq 3$.

16. The process for producing a polyolefin according to claim 2 wherein said component (D) is one member selected from the group consisting of trimethylaluminum, triethylaluminum, triisobutylaluminum, tri-n-butylaluminum, tri-n-hexylaluminum, tri-n-octylaluminum and triisopropylaluminum.

17. The process of claim 3, wherein components (A), (B) and (C) are contacted so as to meet the conditions:

$$1<[Al_{AO}]/[Ti]<500; \tag{1}$$

and $$1<[\pi]/[Ti]<2,000 \tag{2}$$

wherein [Ti] is a molar concentration of component (A), $[Al_{AO}]$ is a molar concentration of component (B) and $[\pi]$ is molar concentration of component (C).

18. The process of claim 4, wherein components (A), (B), (C) and (D) are contacted so as to meet the conditions:

$$1<[Al_{AO}]/[Ti]<500; \tag{1}$$

$$1<[\pi]/[Ti]<2,000; \tag{2}$$

and $$1<[Al_R]/[Ti]<500 \tag{3}$$

wherein [Ti] is a molar concentration of component (A), $[Al_{AO}]$ is a molar concentration of component (B), $[\pi]$ is a molar concentration of component (C) and $[Al_R]$ is a molar concentration of component (D).

* * * * *